United States Patent
Wobben

(10) Patent No.: US 7,098,551 B2
(45) Date of Patent: Aug. 29, 2006

(54) WIND POWER INSTALLATION WITH CONTACTLESS POWER TRANSMITTER

(76) Inventor: Aloys Wobben, Argestrasse 19, Aurich (DE) 26607

( * ) Notice: Subject to any disclaimer, the term of this patent is extended or adjusted under 35 U.S.C. 154(b) by 0 days.

(21) Appl. No.: 10/493,798

(22) PCT Filed: Sep. 4, 2002

(86) PCT No.: PCT/EP02/09864

§ 371 (c)(1),
(2), (4) Date: Oct. 20, 2004

(87) PCT Pub. No.: WO03/038990

PCT Pub. Date: May 8, 2003

(65) Prior Publication Data

US 2005/0046194 A1    Mar. 3, 2005

(30) Foreign Application Priority Data

Oct. 31, 2001    (DE) ............................... 101 53 644

(51) Int. Cl.
*F03D 9/00* (2006.01)
(52) U.S. Cl. ...................................................... 290/44
(58) Field of Classification Search ................. 290/44
See application file for complete search history.

(56) References Cited

U.S. PATENT DOCUMENTS

| | | | |
|---|---|---|---|
| 2,891,211 A | 6/1959 | Stonehouse | 321/24 |
| 3,930,175 A * | 12/1975 | Chirgwin | 310/160 |
| 4,015,189 A | 3/1977 | Gorden | 322/46 |
| 4,121,148 A * | 10/1978 | Platzer | 322/59 |
| 5,083,039 A * | 1/1992 | Richardson et al. | 290/44 |
| 5,418,446 A * | 5/1995 | Hallidy | 322/28 |
| 5,598,091 A * | 1/1997 | Satake et al. | 322/62 |
| 5,770,909 A | 6/1998 | Rosen et al. | 310/113 |
| 6,188,204 B1 * | 2/2001 | Vithayathil et al. | 322/29 |
| 6,256,212 B1 * | 7/2001 | Wobben | 363/40 |
| 6,624,617 B1 * | 9/2003 | Holzer et al. | 322/29 |
| 6,724,099 B1 * | 4/2004 | Klaar | 290/52 |
| 6,906,447 B1 * | 6/2005 | Leijon et al. | 310/196 |

FOREIGN PATENT DOCUMENTS

| | | | |
|---|---|---|---|
| DE | 2258284 | * | 6/1974 |
| DE | 196 37 146 A1 | | 3/1998 |
| DE | 196 44 705 A1 | | 4/1998 |
| DE | 198 01 803 A1 | | 4/1999 |
| DE | 199 20 504 A1 | | 6/2000 |
| DE | 100 09 472 A1 | | 9/2001 |
| DE | 101 27 102 A1 | | 12/2002 |

(Continued)

*Primary Examiner*—Joseph Waks
(74) *Attorney, Agent, or Firm*—Seed IP Law Group PLLC

(57) ABSTRACT

A wind power installation for producing a sinusoidal ac voltage is disclosed. Briefly described, one embodiment comprises a generator having a generator rotor and a generator stator; a rotor unit with rotor blades which are connected to the generator rotor; and a power transmission means for the transmission of electrical power from the non-rotating part of the wind power installation to the rotor unit, the power transmission means having an asynchronous machine whose stator is arranged at the non-rotating part of the wind power installation and whose rotor is arranged at the rotor unit for contactless transmission of electrical power to the rotor unit, and arranged in the non-rotating part of the wind power installation is an inverter for producing an ac voltage having a periodic voltage pulse for feeding the stator of the asynchronous machine.

8 Claims, 2 Drawing Sheets

FOREIGN PATENT DOCUMENTS

EP  348938 A1 * 1/1990

EP  1426616 A1 * 6/2004

* cited by examiner

WIND POWER INSTALLATION WITH CONTACTLESS POWER TRANSMITTER

BACKGROUND OF THE INVENTION

1. Field of the Invention

The invention concerns a wind power installation for producing a sinusoidal ac voltage comprising a generator having a generator rotor and a generator stator, a rotor unit with rotor blades which is connected to the generator rotor, and power transmission means for the transmission of electrical power from the non-rotating part of the wind power installation to the rotor unit.

2. Description of the Related Art

In the case of wind power installations it is necessary for power to be transmitted from the non-rotating part to the rotating part, for various purposes. For example, in the case of an electromagnetically excited synchronous generator, a direct current is required as the exciter current for the pole wheel, and for rotor blade adjustment by means of suitable electric motors that also requires electrical power. At the present time that power is transmitted from the non-rotating part of the wind power installation to the rotating part by means of slip rings. Slip rings however basically suffer from the disadvantage that losses occur by virtue of the friction involved, that is to say the level of efficiency is reduced, a large amount of noise is generated, and in particular they suffer from a high level of wear, and therefore need to be repaired or have to be replaced from time to time. In addition electrical flash-overs can occur at such slip rings. They are even further promoted with increasing operating time, due to the abrasion of particles.

DE 198 01 803 A1 discloses an electrical rotational machine with a stationary stator and a rotatable rotor. In that case they have a stator transformer winding and a rotor transformer winding respectively, wherein the transformer windings form an electrical transformer and are each designed for operation with alternating current. By means of the transformer windings a three-phase current which is fed in from a supply network can be transmitted to the rotating part of the wind power installation, and is then fed to the three-phase current, generator winding disposed in the stator of the generator of the wind power installation, for excitation purposes.

U.S. Pat. No. 5,770,909 describes a synchronous machine for electrically operated vehicles, with which the power of the generator is to be optimised for all travel conditions, in particular over a rotary speed range of from zero to several thousand revolutions per minute.

BRIEF SUMMARY OF THE INVENTION

Therefore the object of the present invention is to provide an improved way of transmitting the electrical power from the non-rotating part of the wind power installation to the rotating part.

In accordance with the invention, starting from the wind power installation set forth in the opening part of this specification, that object is attained in that the power transmission means have an asynchronous machine whose stator is arranged at the non-rotating part of the wind power installation and whose rotor is arranged at the rotating part for contactless transmission of electrical power to the rotating part and that arranged in the non-rotating part of the wind power installation is an inverter for producing an ac voltage having a periodic voltage pulse for feeding the stator of the asynchronous machine.

In that respect the invention is based on the realisation that mechanical problems due to friction which occurs can be avoided by contactless transmission of the electrical power. An easy way of doing that is represented by the asynchronous machine which is proposed in accordance with the invention and whose rotor is connected to the rotating part of the wind power installation, preferably to the rotating hub, while the stator thereof is connected to the non-rotating part of the wind power installation, that is to say the machine carrier. Due to a relative movement therefore, as between the rotor and the rotating stator field of the asynchronous machine, an electrical field is induced in the rotor windings and in that way a voltage is produced in the rotor windings. In that situation the asynchronous machine is operated in a generator mode. The ac voltage induced in the rotor windings can then be further processed with suitable further means for use for the desired purpose in the rotating part of the wind power installation.

The arrangement proposed in accordance with the invention for the contactless transmission of electrical power suffers from losses to a substantially lesser degree and is wear-free. The noise level generated is drastically reduced, compared to the known use of slip rings.

Advantageous configurations of the invention are set forth in the appendant claims. The invention is preferably used in an electromagnetically excited synchronous generator in order there to derive a direct current as an exciter current for the rotor of the synchronous generator from the electrical power transmitted by the asynchronous machine. For that purpose there is preferably provided a suitable rectifier in the rotating part of the wind power installation, wherein in a further embodiment an LC filter can be connected on the input side thereof in order to compensate for reactions of the pole wheel of the synchronous machine, for example in the harmonics range.

In a further advantageous configuration of the invention there is provided at least one further rectifier with which a dc voltage or also a direct current can be produced in order to supply further units on the rotor unit of the wind power installation with electrical power. For example, provided for blade angle adjustment of the individual rotor unit blades are electric motors which are to be supplied with a dc voltage. That supply is afforded in a simple manner in accordance with the invention.

Preferably, arranged in the non-rotating part of the wind power installation is an inverter with which an ac voltage is generated to feed the stator of the asynchronous machine provided in accordance with the invention, for power transmission purposes. That inverter preferably generates an ac voltage at a frequency of about 400 to 600 Hz. Advantageously, regulation of the exciter current of the rotor of the generator can even be effected in dependence on the speed of rotation and the electrical power of the generator, by means of the inverter. In particular the amplitude of the exciter current for the pole wheel of a synchronous generator can advantageously be regulated by the Inverter.

For many purposes within the rotor unit of the wind power installation, it is necessary for the dc voltage present to be as constant as possible. For that purpose, besides a rectifier, it is also possible to provide a capacitor which also additionally smoothes the output voltage of the rectifier. In order repeatedly to charge up that capacitor to the peak value, it can therefore be provided that the inverter periodically produces a voltage pulse. At the same time the capacitor serves as an intermediate storage device in order to provide sufficient electrical power, even in the event of failure of the current supply, at least for an emergency adjustment procedure.

As the asynchronous machine is advantageously operated at a frequency of 400 to 600 Hz and as there is an air gap from the primary winding to the secondary winding, the asynchronous machine has a very high reactive current requirement. That reactive current in accordance with the invention can be provided if connected on the input side of the stator of the asynchronous machine is an LC filter for setting the reactive current of the current fed to the stator.

BRIEF DESCRIPTION OF THE SEVERAL VIEWS OF THE DRAWINGS

The invention is described in greater detail hereinafter with reference to the drawings in which.

DETAILED DESCRIPTION OF THE INVENTION

Figure 1:
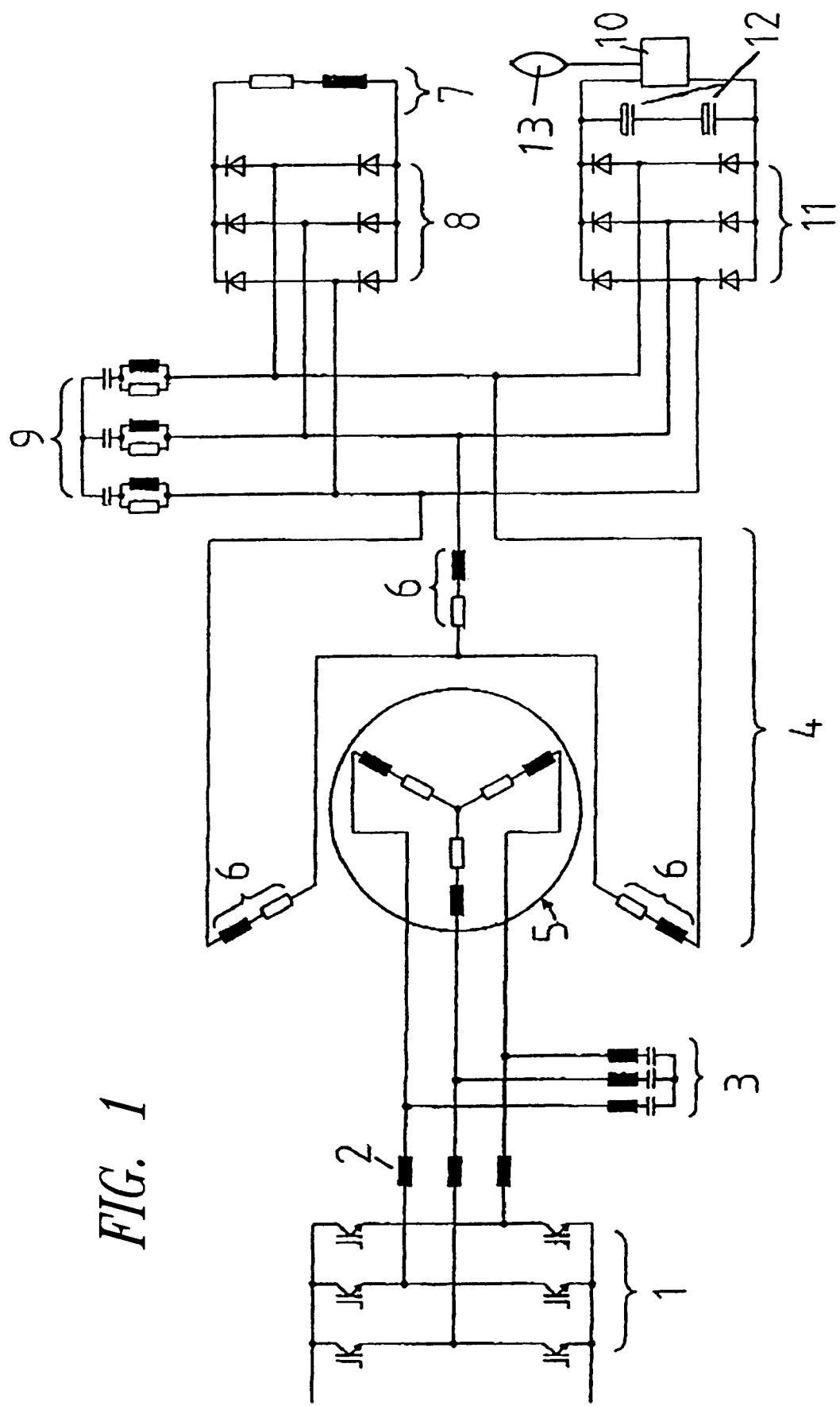
FIG. 1 shows a circuit diagram of the solution according to the invention.

The circuit diagram in FIG. 1 shows the solution according to the invention for contactlessly transmitting electrical power from the non-rotating part of the wind power installation to the rotating part. For that purpose there is firstly provided an inverter 1 which generates an ac voltage at a frequency of 400 to 600 Hz, preferably about 500 Hz. Provided in the connecting lines between the inverter 1 and the stator 5 of the asynchronous machine 4 are short-circuit limiting reactors 2 and LC filters 3 connected in a star circuit configuration. The ac voltage produced by the inverter 1 and smoothed by means of the reactor chokes 2 is thus fed into the non-rotating stator 5 of the asynchronous machine 4. By virtue of the stator field which rotates in the stator windings, an electrical field is induced in the secondary windings of the rotor 6 by virtue of the relative movement between the rotor and the stator field and thus a voltage is produced in the stator windings.

The rotating stator 6 is mechanically connected to the hub of the wind power installation. The electrical power can thus be contactlessly transmitted from the stationary part, that is to say the machine carrier of the wind power installation, to the rotating part, the rotor unit head.

The ac voltage induced in the rotor 6 is fed on the one hand to a rectifier 8 which rectifies that ac voltage and the pole wheel 7 of the electromagnetically excited synchronous generator of the wind power installation. The rectifier 8 thus has an inductive load and the voltage acting at the pole wheel 7 is the effective root-mean-square value of the voltage. Preferably the inverter 1 regulates the output voltage in such a way that the effective voltage at the output of the rectifier 1 causes the desired direct current for the pole wheel 7 to flow. In that situation the high inductance of the pole wheel 7 smoothes the current and evens out the waviness of the output voltage of the rectifier 8. If the Inverter 1 produces high voltages for a short time, they are compensated by the inductance of the pole wheel 7 if thereafter a lower voltage is produced. It is therefore possible with the asynchronous machine 4 In conjunction with the rectifier 8 to produce a regulated direct current for the pole wheel 7. The amplitude of the exciter current for the pole wheel 7 should in that case be regulated in dependence on the rotary speed and the electrical power of the synchronous generator by the inverter 1.

The ac voltage induced in the rotor 6 can also be used for further purposes on the rotating part of the wind power installation. Thus for example a rotor blade adjustment unit 10 requires a dc voltage. That dc voltage is produced from the ac voltage of the rotor 6 by a rectifier 11. That dc voltage is dependent on the amplitude of the output voltage of the rotor 6 as that involves peak value rectification.

The capacitors 12 are always charged up. In that respect the capacitance of the capacitors 12 is such that the stored amount of current is sufficient to actuate the rotor blade adjustment unit 10 of each rotor blade in the event of a power failure, in order to be able to securely implement emergency shut-down of the wind power installation and rotation of the rotor blades 13 into the feathered position.

Figure 2:
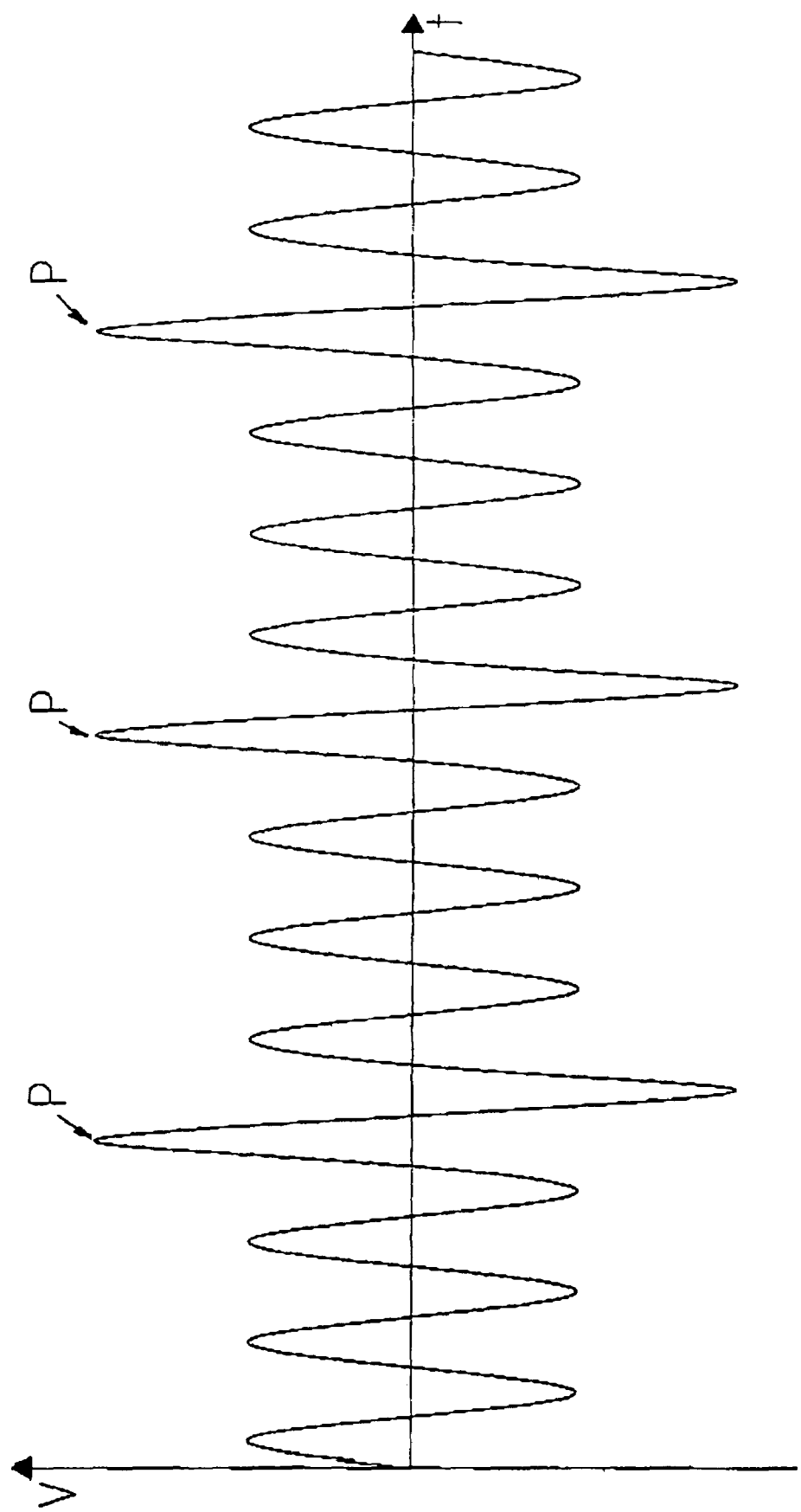
FIG. 2 shows the configuration of the voltage of an inverter for feeding the asynchronous machine.

The transmitter 4 which is in the form of an asynchronous machine therefore contactlessly delivers electrical power to the rotating part of the wind power installation, and that on the one hand supplies the pole wheel of the generator with a direct current and on the other hand also supplies further electrical units such as the rotor blade adjustment unit with a dc voltage. For that purpose the inverter 1 periodically produces a voltage pulse which repeatedly charges up the capacitors 12 to the peak value. Such a voltage configuration in respect of the output voltage of the inverter 1 is shown in FIG. 2. It is possible to clearly see the periodic voltage pulses P for charging up the capacitors 12 to the required voltage. It has also been found however that those peaks are not required but that the capacitors can also be charged up without those peaks to a sufficiently high voltage to actuate the blade adjustment drive means.

The asynchronous machine 4 is preferably operated at a frequency of about 500 Hz and has an air gap from the primary winding to the secondary winding. Those two conditions require a very high reactive current requirement. The LC filter 3 is intended to produce that high reactive current. The pole wheel 7 which is connected on the output side of the rectifier 8 also requires a very high reactive current. It comprises in part the fundamental oscillation and the harmonics such as for example the fifth, seventh, eleventh and thirteenth harmonics. The LC filter 9 comprising three star-connected branches each with a series circuit comprising a capacitor and a parallel circuit comprising a resistor and an inductor are intended to deliver that reactive power. Overall the level of efficiency of power transmission is enormously improved by the two filters 3 and 9.

The solution according to the invention can thus easily provide for contactlessly transmitting power from the non-rotating part of the wind power installation to the rotating part for different purposes. In that respect neither wear nor severe noise generation occurs.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A wind power installation for producing a sinusoidal ac voltage comprising:

a generator having a generator rotor and a generator stator;

a rotor unit with rotor blades which is connected to the generator rotor; and a power transmission means for the transmission of electrical power from the non-rotating part of the wind power installation to the rotor unit, the power transmission means having an asynchronous machine whose stator is arranged at the non-rotating part of the wind power installation and whose rotor is arranged at the rotor unit for contactless transmission of electrical power to the rotor unit, and arranged in the non-rotating part of the wind power installation is an inverter for producing an ac voltage having a periodic voltage pulse for feeding the stator of the asynchronous machine.

2. A wind power installation according to claim 1 characterised in that the generator is an electromagnetically excited synchronous generator and that provided at the rotor unit is a rectifier for conversion of the electrical power transmitted to the rotor of the asynchronous machine into a direct current which is fed to the rotor of the generator as an exciter current.

3. A wind power installation according to claim 2 characterised in that a filter for adjusting the reactive current is connected on the input side of the rectifier.

4. A wind power installation according to claim 1 characterised in that a rectifier is provided at the rotor for converting the electrical power transmitted to the rotor of the asynchronous machine into a dc voltage, in particular for supplying a rotor blade adjustment.

5. A wind power installation according to claim 1 characterised in that the inverter is adapted to regulate the exciter current of the rotor of the generator in dependence on the rotary speed and the electrical power of the generator.

6. A wind power installation according to claim 1 characterised in that connected on the input side of the stator of the asynchronous generator is an LC filter for adjusting the reactive current of the current fed to the stator.

7. A wind power installation according to claim 1, further comprising:

a rotor blade adjustment unit that rotates the plurality of rotor blades into a feathered position during an emergency shutdown.

8. A wind power installation according to claim 7, further comprising:

at least one capacitor coupled to the rotor blade adjustment unit, such that an amount of stored current in the capacitor is sufficient to actuate the rotor blade adjustment unit to rotate the plurality of rotor blades into the feathered position during the emergency shutdown.

* * * * *